United States Patent [19]

Lunde et al.

[11] 4,141,439
[45] Feb. 27, 1979

[54] CAM OPERATED CLUTCH AND BRAKE

[75] Inventors: James M. Lunde, Taylors Falls; John G. Schwartz, Jr., South St. Paul, both of Minn.

[73] Assignee: Osceola Clutch & Brake Company, Minneapolis, Minn.

[21] Appl. No.: 745,232

[22] Filed: Nov. 26, 1976

Related U.S. Application Data

[63] Continuation-in-part of Ser. No. 650,041, Jan. 19, 1976, abandoned.

[51] Int. Cl.² .................. A01D 55/18; F16D 67/02
[52] U.S. Cl. ..................... 192/18 R; 192/14; 192/89 A; 192/107 R; 192/113 B; 56/11.3
[58] Field of Search ............ 192/14, 16, 12 R, 18 R, 192/93 A, 89 A, 18 A; 56/11.3, 11.7, 11.8

[56] References Cited

U.S. PATENT DOCUMENTS

| | | | |
|---|---|---|---|
| 2,446,138 | 7/1948 | Lambert | 192/93 A |
| 2,812,047 | 11/1957 | Smitzer | 192/18 R |
| 2,825,434 | 3/1958 | Smitzer | 192/18 R |
| 2,975,584 | 3/1961 | Makant et al. | 192/18 A |
| 2,985,992 | 5/1961 | Dowdle | 192/18 R X |
| 3,099,338 | 7/1963 | Urquhart | 192/14 X |
| 3,420,343 | 1/1969 | Stiepel | 192/18 R |
| 3,871,159 | 3/1975 | Shriver | 192/18 R X |

*Primary Examiner*—Benjamin W. Wyche
*Attorney, Agent, or Firm*—Merchant, Gould, Smith, Edell, Welter & Schmidt

[57] ABSTRACT

A combined clutch and brake mechanism for use in such applications as power lawnmowers. During actuation of a manual control the brake is released and power is transmitted from the engine to the blade carrier. If the manual control is released, power transmission is disabled and braking is initiated, the braking being maximized by the very motion of the member being braked. The invention is also shown in a form adaptable for use in general power transmission applications.

8 Claims, 14 Drawing Figures

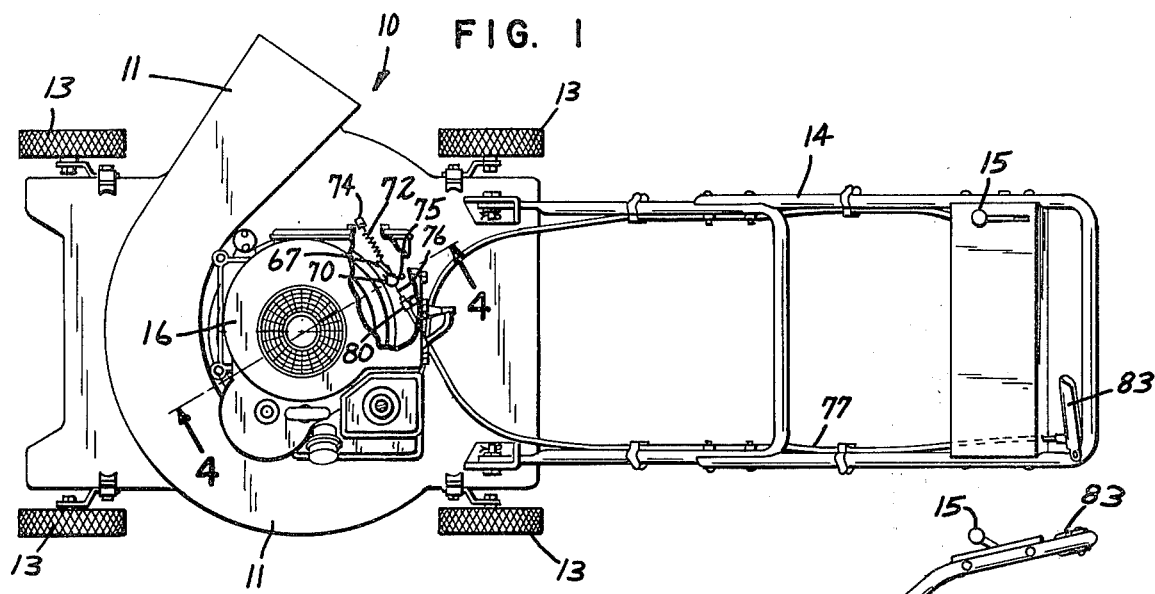
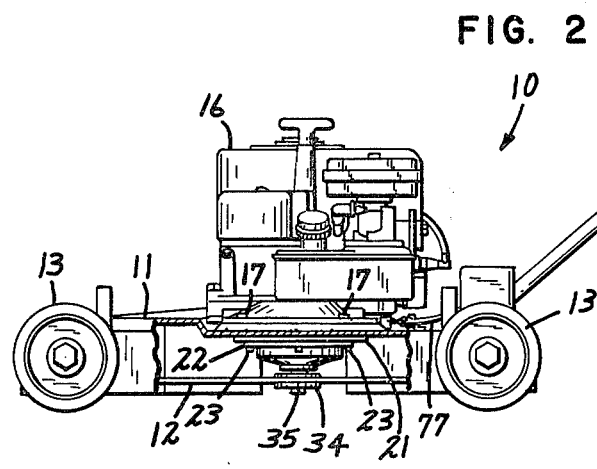
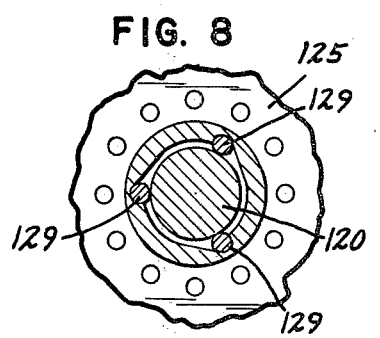
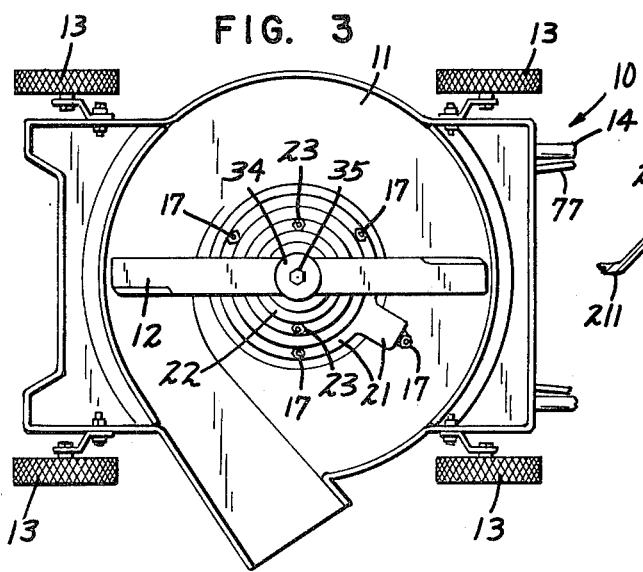
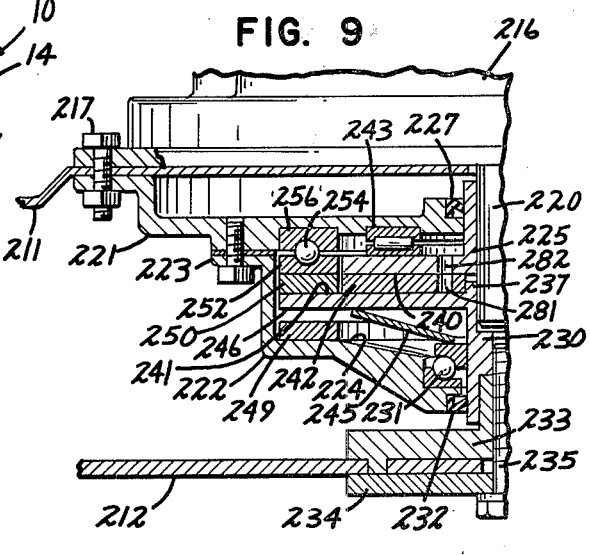

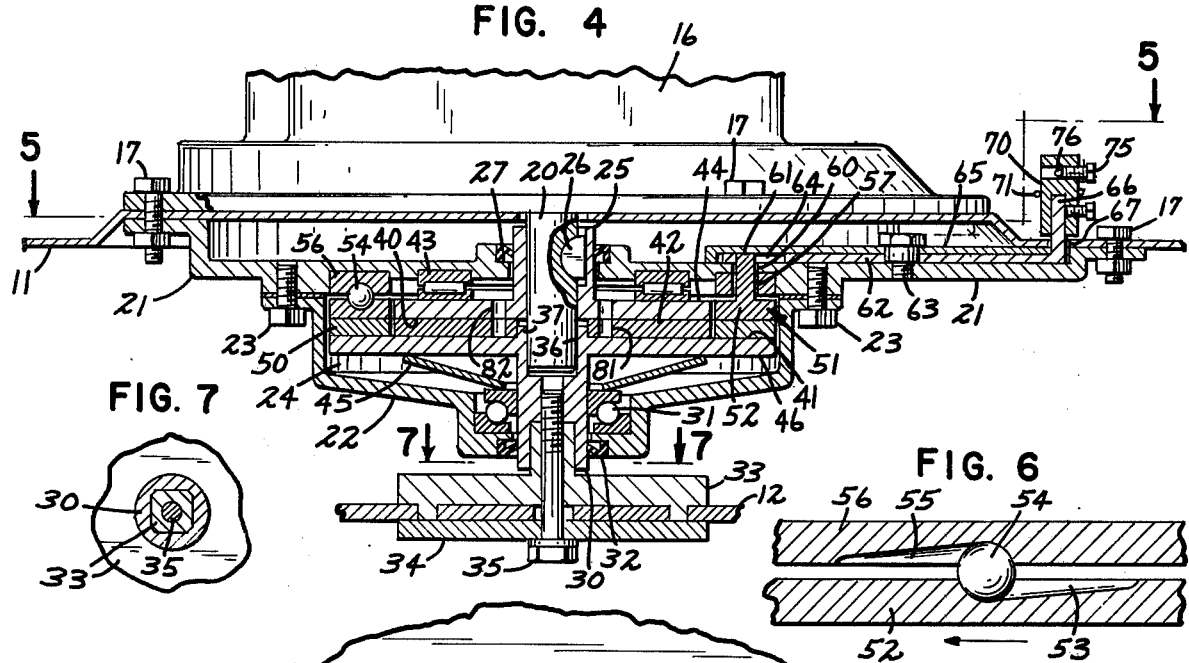
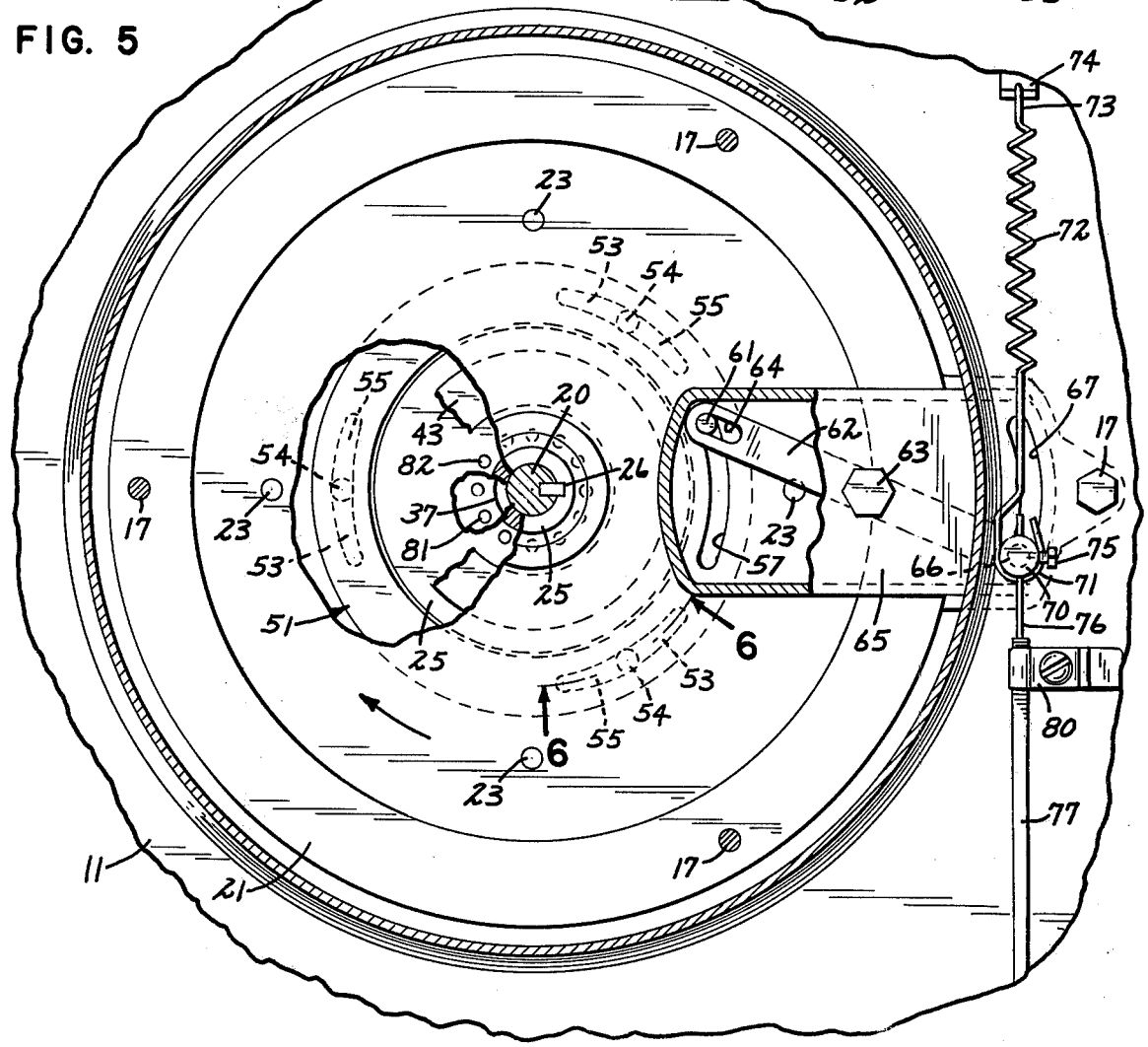

CAM OPERATED CLUTCH AND BRAKE

This is a continuation-in-part application of application Ser. No. 650,041, filed Jan. 19, 1976 and now abandoned.

BACKGROUND OF THE INVENTION

This invention relates to the field of power transmission, and more especially to an arrangement which may be actuated by an operator to cause power transmission from a power source to a driven member, but which functions, when released by the operator, to disable the power transmission and simultaneously brake the member. It is particularly adapted for use in the driving train of a power lawnmower between the engine and the blade.

It is well-known that power lawnmowers of the horizontal rotary blade type are operated by users of differing age, prudence, and mechanical aptitude to care for lawns of various configurations, and that such users occasionally lose control of the mower by inattention, loss of balance, or poor footing, for example. Under such circumstances, it is possible for the mower to thereafter roll, by its inertia or by reason of sloping ground, in such a manner as to injure the user.

SUMMARY OF THE INVENTION

The present invention is an arrangement by which the power transmission to the blade of a lawnmower is disabled, and the blade is simultaneously braked, if control of the mower by the user is for any reason interrupted. This is accomplished by interposing a friction disc between a driving member connected to the engine and a driven member connected to the blade, together with a disc spring normally urging the driven member toward the driving member. Further, overriding means are provided to normally force the driving member frictionally away from the driven member, to disable the power transmission and brake the driven member, and still further means are arranged to disable the overriding means as long as the manual control is exerted.

The same inventive principles are used when a portion of the interconnect mechanism is made a physical part of the mower housing, and are further adaptable to use in general power transmission applications when clutching and braking are desired.

Various advantages and features of novelty which characterize our invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing,

FIG. 1 is a general plan view of a mower embodying our invention;

FIGS. 2 and 3 are side and bottom views of the mower;

FIG. 4 is an enlarged sectional view along the line 4—4 of FIG. 1;

FIG. 5 is a sectional view along the line 5—5 of FIG. 4;

FIG. 6 is a fragmentary sectional view along the arcuate line 6—6 of FIG. 5;

FIG. 7 is a fragmentary sectional view along the line 7—7 of FIG. 4;

FIG. 8 is a fragmentary enlarged view generally like FIG. 5 showing a modification;

FIG. 9 is a fragmentary view like FIG. 4 showing a second modification;

DESCRIPTION OF THE PREFERRED EMBODIMENTS

Figure 10:
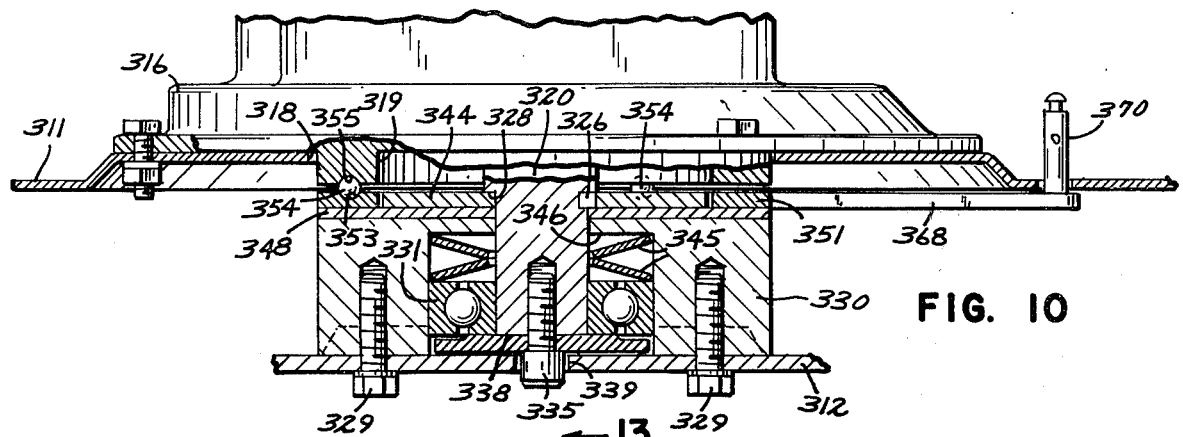
FIG. 10 is a view like FIG. 4 showing a further modified form of the invention.
Figure 11:
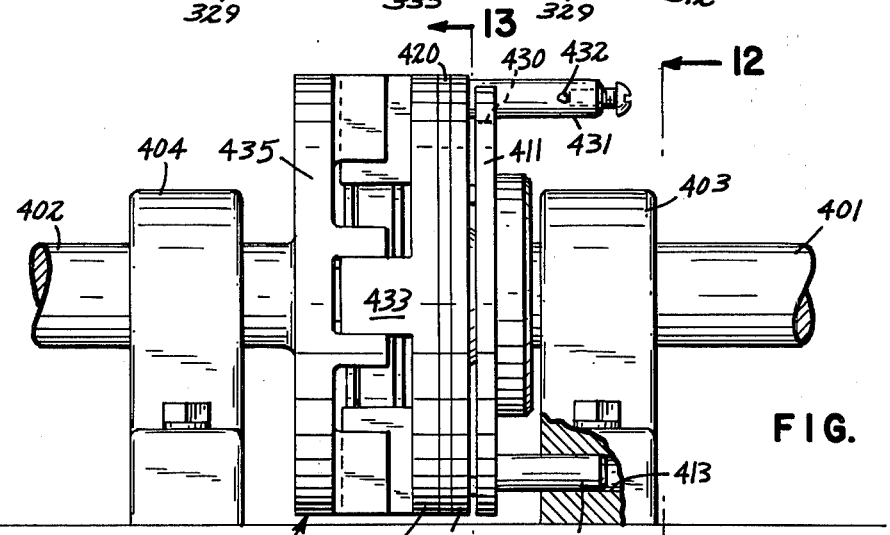
FIG. 11 is a view in elevation of apparatus embodying the invention in a general power transmission application.
Figure 12:
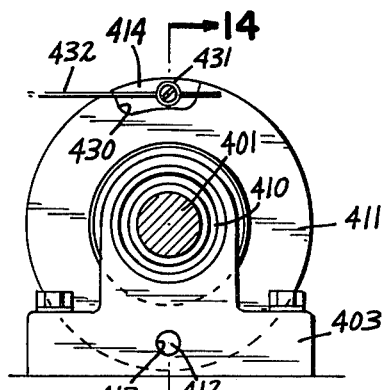
FIGS. 12 and 13 are sectional views, to a smaller scale, taken along the lines 12—12 and 13—13, respectively of FIG. 11; and, FIG. 14 is a sectional view taken along the line 14—14 of FIG. 12, to a larger scale than FIG. 11, parts being omitted for clarity of illustration.
Figure 13:
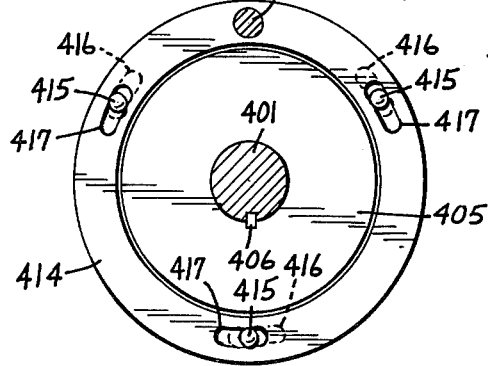
Figure 14:
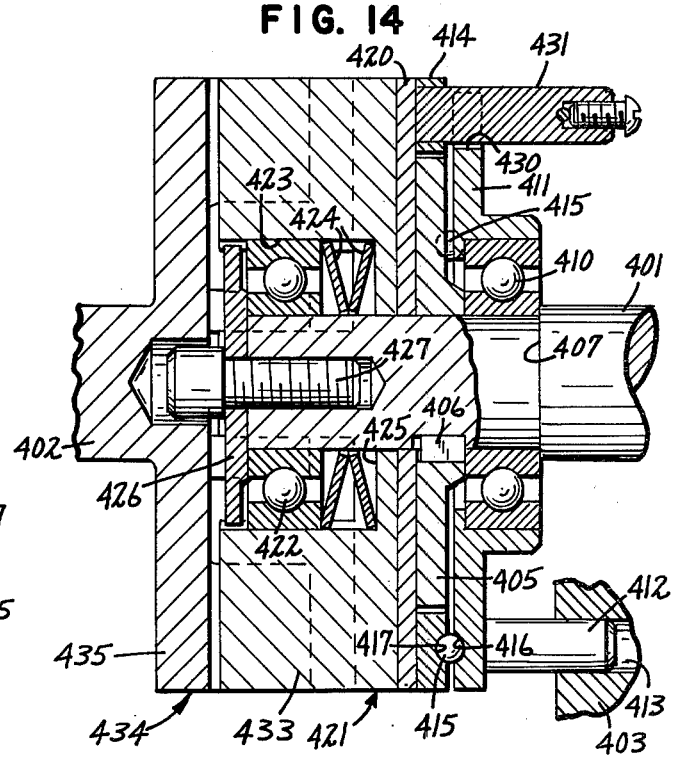

As shown in FIGS. 1-3, our invention is installed in a rotary blade lawnmower 10 including a housing 11 in which a blade 12 is rotated about a vertical axis. As usual, housing 11 is mounted on wheels 13 and is provided with a handle 14 including a throttle control 15 for the engine 16, shown schematically, which is mounted on the housing as by fasteners 17.

FIGS. 4 and 5 show that engine 16 has a vertical shaft 20 extending downwardly. Housing 11 has two further portions 21 and 22 to contain mechanism about to be described: these portions are held together by fasteners 23, and the assembly is mounted to the main housing by fasteners 17. Main housing 11 and portion 21 are centrally apertured to pass shaft 20, and portion 22 is also centrally apertured.

Portions 21 and 22 cooperate to define a clutch chamber 24 containing a driving member 25 secured to shaft 20 by means of a Woodruff key 26 and passing through an oil seal 27 in portion 21. A driven member 30 is also mounted in chamber 24, on a bearing 31, and passes through a second oil seal 32. A limited amount of axial movement of member 30 in bearing 31 is possible.

A driver 33 for blade 12 is secured to member 30 by means including a plate 34 and a bolt 35. Driven member 30 is bored at 36 to act as a pilot bearing for shaft 20, and has a central annular ridge 37. Members 25 and 30 have flat inward surfaces 40 and 41 respectively, and a disc 42 of friction material is located therebetween, being centered by ridge 37. A thrust bearing 43 is located between the outward upper surface 44 of member 25 and the adjacent wall of housing portion 21, and a disc spring 45 is located between the outward lower surface 46 of driven member 30 and bearing 31. The arrangement is such that spring 45 continuously urges member 30 upwardly to cause engagement of surfaces 40 and 41 with disc 42, biasing the structure into a configuration which causes power transmission from shaft 20 to blade driver 33.

Driven member 30 is of larger diameter than driving member 25, and a further friction ring 50 rests on surface 41 and surrounds disc 42. Ring 50 comprises part of a control means 51 which also includes a flat metal ring 52 engaging the upper surface of friction ring 50. The upper surface of ring 52 is provided with a plurality of grooves 53 of limited arcuate extent disposed circularly about the axis of shaft 20 and of uniformly varying depths. A like plurality of steel balls 54 ride in grooves 53. A second set of similar grooves 55 is formed in a second flat ring 56 fixed to housing portion 21 in apposition to ring 52, or these may indeed be formed directly in the housing portion. Ring 56 and housing portion 21 are formed with aligned arcuate slots 57, 60 and a pin 61 projects from ring 52 through the arcuate slots. A lever 62 pivoted at 63 has a slot 64 at its inner end to engage pin 61, and is restrained under a cover plate 65. At the outer end of lever 62 a tab 66 projects upwardly through a slot 67 in housing 11, and carries a connector 70 around which is passed one looped end 71 of a coil spring 72 having its other end 73 secured to housing 11 as at 74. Also secured to connector 70 by a set screw 75 is the end of a Bowden wire 76, whose outer spiral 77 is clamped to housing 11 at 80.

We have found that tempered masonite is an excellent material for use as disc 42 and ring 50, particularly if the chamber 20 is filled with oil. Disc 42 has a plurality of apertures 81, and driving member 25 has a plurality of apertures 82, to allow the egress of oil trapped between the disc and the flat surfaces when power transmission is being initiated.

Grooves 53 and 55 have their varying depths increasing in opposite directions, grooves 53 being deeper in the direction of rotation of shaft 20, and grooves 55 being shallower in that direction. Thus, when ring 52 is pivoted clockwise as seen in FIG. 5 with respect to ring 56, the rings are displaced axially by twice the depth difference of a groove. This is accompanied by downward movement of ring 52, friction ring 50, and driven member 30, which is permitted this slight axial movement in bearing 31. Lever motion is caused by the action of coil spring 72 which overrides disc spring 45: power transmission to drive member 30 is interrupted at disc 42, and the member is braked at ring 50. This is the normal or inoperative state of the device.

When it is desired to operate the mower, the user actuates a "deadman" type of control handle 83, acting through Bowden wire 76 to pivot lever 62 clockwise as seen in FIG. 5. This allows rings 52 and 56 to take the relative positions shown in FIG. 6, where they are at their closest spacing. Now no significant amount of force is applied through balls 54, flat ring 52 and fixed ring 50 to driven member 30: disc spring 45 urges driven member 30 toward member 25 to cause engagement between the members and disc 42, any intervening oil being forced out either at the edge of the disc or through the apertures 81, 82, and power transmission is established.

It is to be particularly noted that when handle 83 is released, spring 72 begins to act through lever 62 on ring 51, and that the direction of rotation given to ring 52 by ring 50 and member 30 is such as to urge the ring rapidly in the braking direction. This accomplishes full braking even should spring 72 weaken to give less than rated force when fully contracted.

FIG. 8 shows a modification of the invention in which shaft 120 is connected to driving member 125 by an overriding clutch including balls 129 instead of by a key. In this arrangement, blade 12 may be manually rotated forward, without also driving shaft 20 and engine 16, which is sometimes an advantage.

A second modification of the invention is shown in FIG. 9, where parts which are the same as in the earlier modification are given the same numbers in the 200 series. This embodiment differs from that of FIG. 4 in the provision of an additional friction ring 249 secured in housing portion 222 below driven member 230. In the driving condition of the apparatus, this new ring is not operative, but when ring 252 is rotated to force ring 250 and driven member 230 downward, the outward lower surface 246 of the latter moves into engagement with ring 249, thus multiplying the friction area and hence the braking action.

A further modification of the invention is shown in FIG. 10, wherein parts which are the same in earlier modifications are given the same numbers in the 300 series. In this embodiment the clutch-brake mechanism is not intended to operate in oil, and is not contained in housing elements such as 21, 22 or FIG. 1. Housing 311 has a much larger central opening 318 than before, and motor 316 has a ridge 319 projecting through opening 318 which takes the place of member 56 of FIG. 4 and carries on its lower surface three curved grooves 355 of uniformly varying depth and limited angular extent to receive balls 354. An annular member 351 carries similar grooves 353 to receive balls 354 in cooperation with grooves 355, whereby to give the member limited rotation about the axis of shaft 320, and may be actuated by extension 368 carrying an actuator connection 370.

Motor shaft 320 is provided with shoulder 328 at a specific distance from the end of the shaft, and a driving member 344 is carried on the shaft and driven by a key 326. A driven member 330 is carried in a bearing 331 on shaft 320, and a pair of disc springs 345 act between bearing 331 and a lower surface 346 of member 330. A single disc 348 of friction material is located between driven member 330 and driving member 344, and performs the functions of members 42 and 50 of FIG. 4. The elements just recited are held in place by a washer 338 and bolt 335. Blade 312 is bored at 339 to pass the head of bolt 335, and is mounted on member 330 by bolts 329.

As before, grooves 353 and 355 are of oppositely varying depths, so that member 351 moves downwardly, as seen in FIG. 10, with rotation of the member in the same direction as that of shaft 320, to brake member 330, through friction member 348, and release the drive.

The distance between shoulder 328 and the end of shaft 320 is such that when bolt 335 is tightened, springs 345 are put under considerable stress, and press driven member 330 and hence member 348 toward driving member 344 to make a driving connection from motor 316 to blade 312. In the normal rotated position of the member 351, however, it is forced by balls 354 against friction member 348, compressing springs 345 to release the drive engagement with member 344 and to brake member 330 by friction through member 348. Operation of actuator 368 to rotate member 351 in the opposite direction allows springs 345 to push members 330 and 348 into driving engagement with member 344 and release the brake and allow slip between members 348 and 351.

If one of members 330 and 351 is bronze and the other is steel, the interposition of a separate friction disc 348 may not be necessary, the natural surface characteristics of these dissimilar metals being sufficient friction means to accomplish the desired clutching and braking satisfactorily.

FIGS. 11–14 show how our inventive principle may be applied to the simple transmission of power from a drive shaft 401 to a driven shaft 402, carried respectively in pillow blocks 403 and 404. A driving member 405 is carried on shaft 401 and driven through a key 406.

A shoulder 407 is provided on shaft 401 against which is positioned a first bearing 410 carrying a first control member 411 from which a positioning pin 412 projects into an opening 413 in pillow block 403, to prevent rotation of the member. A second, annular control member 414 is concentric with and spaced from member 411. Three balls 415 are carried between short circular grooves 416 in member 411 and similar grooves 417 in member 414: the grooves are of opposite uniformly varying depth, and the arrangement is the same as that of elements 54, 55, and 53 of FIG. 6.

Separated from members 414 and 405 by a disc of friction material 420 carried by shaft 401 is a driven member 421 carried on shaft 401 in a bearing 422 received in a recess 423 in the member: a pair of disc springs 424 act between bearing 422 and the bottom surface 425 of recess 423. The elements are held in assembled relation by washer 426 and bolt 427. If the load on shaft 402 has considerable inertia, friction disc 420 may be made of material known as raybestos R451, a product of Raybestos-Manhatten Incorporated, Trumbull, Connecticut.

Memeber 411 has a peripheral notch 430 through which projects a connection 431 carried by member 414 to permit angular displacement of member 414 with respect to member 411 by suitable means such as a Bowden wire 432. As in FIG. 10, the distance between shoulder 407 and the end of shaft 401 is such that when bolt 427 is tightened a frictional drive occurs between members 405 and 421 through disc 420, unless member 414 is rotated to press against disc 414 toward member 421, compressing springs 424, releasing the friction drive from member 405, and braking member 421.

The left-hand end of member 421 is formed as one-half 433 of a dog clutch 434, of which the other half 435 is secured to or integral with shaft 402. This provides for the slight axial movement of member 421 which accompanies control operation of member 414.

From the foregoing it will be evident that we have invented a new and improved arrangement which combines clutching and braking operations as opposite states of a single simple mechanism, and one moreover in which the motion of the member being braked has itself the effect of maximizing the braking force.

Numerous characteristics and advantages of our invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. Means for controlling the transmission of power from a source such as an engine to a use element such as a rotating blade, comprising, in combination:
   a driving member mounted for rotation about an axis with respect to a stationary housing, and having an inward clutching surface;
   a driven member mounted for rotation about and limited translation along said axis and having an inward clutching surface apposed to said surface of said driving member;
   a first friction member freely rotatable about said axis for engagement by said clutching surfaces;
   resilient means normally urging said driven member toward said driving member to bring about power transmission from said driving member through said first friction member to said driven member;
   a second friction member freely rotatable about said axis to engage a further portion of said clutching surface of said driven member;
   control means including a first portion fixed with respect to said housing and a second portion pivotable about said axis, in apposition to said second friction member, between a first position in which it applies force through said second friction member to displace said driven member axially away from said driving member against the action of said resilient means, disabling the power transmission and causing braking of said driven member, and a second position, in which it applies substantially no force through said second friction member, enabling the power transmission, the direction of pivotal movement of said second portion from said second position to said first position being the same as the direction of rotation of said driven member;
   second overriding resilient means normally pivoting said control means into said first position in opposition to the effect of said first resilient means;
   and means manually operable to pivot said control means into said second position and maintain it there only so long as operating force is applied.

2. The structure of claim 1 in which said first resilient means comprises a disc spring acting axially on said driven member.

3. The structure of claim 1 in which a shaft end projects axially past said flat surface of said driving member and is rotatably received in a pilot bearing in said driven member.

4. The structure of claim 1 in which said housing encloses said driving and driven members, said friction members, said resilient means, and said control means, for operation in a bath of liquid if desired.

5. The structure of claim 4 in which said first friction member and said driving member are perforated to expedite egress of liquid from between said surfaces and said first friction member.

6. In a lawnmower, in combination:
   a housing;
   an engine having a drive shaft projecting vertically downward into said housing;
   a driving member traversed by and secured to said shaft, and having an upper surface and a lower flat surface;
   a thrust bearing between the upper surface of said driving member and a portion of said housing;
   a driven member mounted in said housing for rotation about the axis of said shaft and for limited translation therealong, and having an upper flat surface and a lower surface;
   a friction disc centered by but otherwise free from said upper surface of said driven member for superficial engagement by and between said flat surfaces;
   a disc spring acting on the lower surface of said driven member to continually urge it toward the driving member, to bring about power transmission from said driving member through said friction disc to said driven member;
   a blade secured to said driven member for rotation therewith below said housing;
   a separate friction ring having upper and lower flat surfaces and centered by said friction disc but otherwise free on said upper surface of said driven member;

control means including a ring pivotable about the axis of said shaft, having a flat lower surface for frictionally engaging said further ring and an upper surface provided with a plurality of arcuate grooves of limited angular extent and of depths increasing uniformly from end to end in the same direction, about said axis of said shaft, in the direction of rotation of said driving member, and a plurality of balls contained in said grooves for reaction against said housing so that pivotal movement of said flat ring about said axis causes axial displacement of the ring toward and away from said friction ring;

resilient means continuously urging said flat ring to pivot in the direction of the rotation of the driving member, so that said ring acts on said friction ring to brake said driven member and displace it, against the reaction of said disc spring, with respect to said driving member to disable the power transmission;

and manual means effective while operated to rotate said ring oppositely, disabling said braking and enabling said power transmission.

7. The structure of claim 6 in which said control means includes a further flat ring fixed in said housing, and having grooves to receive said balls, said grooves being apposed to those in the first flat ring and varying oppositely in depth in the direction of rotation of said driving member and further including an arcuate slot located between two of said grooves;

and in which a pin projects from the first ring through the arcuate slot for engagement by an operating member to cause the pivotal movement of the first ring.

8. The structure of claim 1 together with a further friction member carried by said housing in apposition to said driven member for engagement by a portion thereof in said first position of said second portion of said control means.

* * * * *